Feb. 27, 1940. P. A. KINZIE ET AL 2,191,532
INTERIOR DIFFERENTIAL NEEDLE VALVE
Filed March 3, 1936 4 Sheets-Sheet 1

INVENTORS.
Phillip A. Kinzie &
Grover J. Hornsby
BY

ATTORNEY.

INVENTORS.
Phillip A. Kinzie &
Grover J. Hornsby

Feb. 27, 1940. P. A. KINZIE ET AL 2,191,532
INTERIOR DIFFERENTIAL NEEDLE VALVE
Filed March 3, 1936 4 Sheets-Sheet 4

INVENTORS.
Phillip A. Kinzie &
Grover J. Hornsby
BY
ATTORNEY.

Patented Feb. 27, 1940

2,191,532

UNITED STATES PATENT OFFICE 2,191,532

INTERIOR DIFFERENTIAL NEEDLE VALVE

Phillip A. Kinzie and Grover J. Hornsby, Denver, Colo., assignors to Universal Hydraulic Corporation, Denver, Colo., a corporation of Colorado Application March 3, 1936, Serial No. 66,782

11 Claims. (Cl. 137—139)

This application relates to an improved needle valve of the hydraulically actuated type. More particularly, this application relates to improvements on needle valves which employ multiple chambers for hydraulically moving a needle element along the axial center line of flow for the purpose of regulating fluid flow through a concentric body member, and wherein the fluid for controlling said needle element is supplied to the interior actuating chambers from the fluid controlled by said needle element through a manually operated valve which is also geared to the needle element and serves to automatically maintain the needle in any set position.

The inherent smoothness of fluid discharge from valves of this type, even in partially opened positions, makes them particularly well adapted to the regulation of fluid flow. For this reason valves of this type are extensively used for regulating the discharge water from dams and for regulating the flow of water into irrigation canals. Valves of this type can also be used within a penstock as an emergency closure unit in the event that the turbine wicket gates fail to operate, or this type of valve can be used as a jetting and regulation means for impulse-type hydraulic turbines. It is to be understood that these citations of specific uses for this invention are not the only duties which it will perform satisfactorily; for this valve can be used wherever it is desired to shut off, regulate, or discharge water through a pipe, penstock, or orifice.

While we are aware that the general method of actuation and control for this valve are not new, we have discovered a new and more efficient means for constructing a needle valve which employs these principles. The objects which we attain by our improved and simplified needle valve are hereinafter enumerated.

Our invention has as an object, an improved means for supporting and guiding a needle element within a concentric body member.

Our invention has as an object, an improved means for supporting a needle element within a concentric body member, wherein no longitudinal ribs on said body are employed for supporting or guiding the needle element.

Our invention has as an object, an improved means for supporting and guiding a needle element within a concentric body member by means of a tubular extension element on the body member.

Our invention has as an object, an improved means for supporting a needle element within a concentric body member whereby more nearly perfect fluid flow through the valve can be obtained.

Our invention has as an object, an improved means for supporting a needle element within a concentric body member, whereby stresses and reactions produced by fluid pressures and flow are transmitted more directly into the resisting body member.

Our invention has as an object, an improved arrangement of multiple chambers for producing movement of a needle element along its axial center line within a concentric body member.

Our invention has as an object, a sealing means for the multiple actuating chambers of a needle valve.

Our invention has as an object, a sealing means which prevents the intrusion of fluid from the fluidway into the actuating chambers.

Our invention has as an object, an arrangement of closing chambers, within the space enclosed by the needle element, which is powerful enough to effect closure of the needle element against fluid flow by pressure supplied from the controlled fluid.

Our invention has as an object, an improved needle valve which can be operated within a pressure line by the fluid pressure present within said line.

Our invention has as an object, a needle valve controlling means which is manually operated but which will automatically maintain the needle element in any desired position.

Our invention has as an object, an improved arrangement of the elements composing a needle closure means which permits a reduction in diameter and length of the concentric body member.

Our invention has as an object, an improved needle valve wherein the use of expensive, non-corrodible metals is minimized.

Our invention has as an object, an improved construction for a needle valve which will render the elements thereof more accessible.

Our invention has as an object, a simplified means for venting and draining a needle valve.

To make clear the manner by which we attain these objectives and to satisfy the patent statutes, there will now be described the specific embodiments of the invention which have been illustrated in the accompanying drawings, forming a part hereof, and wherein.

Figure 11:
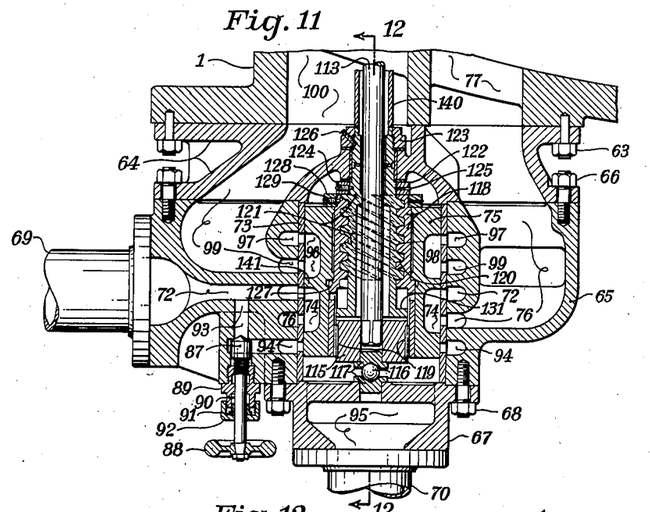
Fig. 11 is a section taken on the plane 11—11 of Fig. 9.
Figure 12:
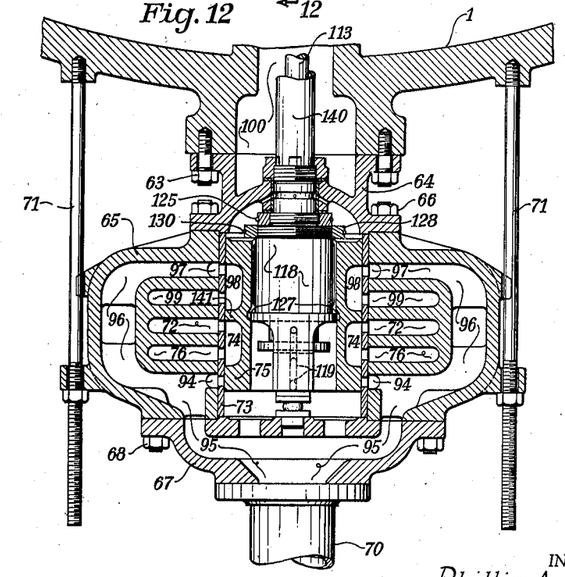
Fig. 12 is a section taken on the plane 12—12 of Fig. 11.

In the accompanying drawings Figs. 1 to 10 inclusive illustrate the complete embodiment of the needle valve and show the auxiliary units, and Figs. 11 and 12 illustrate in detail the control valve unit for the needle valve proper. In the description to follow, for the purpose of clarity, it will be assumed that the direction of fluid flow is from left to right, although the valve would work equally as well with fluid flow in the opposite direction. The condition of having the flow reversed would obviously entail some minor alterations to provide the necessary connections, and slight changes of the contours of the fluid passage, but does not in any way depart from the spirit of the invention.

In the accompanying illustrations (Figs. 1 and 4) fluid enters the valve body 1 through the conduit member 2 which is secured to the needle body by the bolts 3. The valve body 1 is supported by means of the pads 4 (Fig. 4) which rest on concrete piers or some suitable supporting means and which are secured to the supporting means by the anchor bolts 5. The concentric conical-shaped element 6 of the valve body 1 is supported by the two hollow vertical ribs 7 and 8, and by the six plain ribs 9 (Figs. 1, 4, 5, 6, 8 and 9). The body extension member 10 is secured to the flange 11 of the conical body element 6 by the studs 12 (Figs. 4, 7 and 8) and the connection is rendered water-tight by the rubber seal 13. This body extension member 10 is the means for supporting and guiding the needle elements, and is in effect an integral part of the body. The eight ribs 14 (Figs. 4, 8 and 10) which extend inwardly into the annular space 15 between the body extension 10 and the cylindrical liner 16 give additional rigidity to the body extension. The outer diameter of the body extension 10 is recessed for the non-corrodible liner 17 in which the piston ring 18 is received. The ring 19 which is secured to the body extension 10 by the studs 20 retains the piston ring 18 in place. The needle body 21 has an interior non-corrodible liner 22 which rests upon, and is guided by, the exterior flange of the liner 17 and the non-corrodible guide strips 23 (Figs. 4 and 10) on the body extension 10. A non-corrodible ring 24 which is shrunk on the conical element 6 of the body 1 also supports the needle body when the valve is fully open.

The outwardly extending conical portion of the needle body 21 (Figs. 1 and 2) is secured to the diaphragm tube 25 by two semi-circular wedge elements 26 which are so shaped that when the needle tip 27 is drawn on to the needle body 21 by the round head bolts 28, the sloping surface on the needle tip 27 will force the ring into the annular groove 29 in the diaphragm tube 25 and thereby clamp the needle body, needle tip, and diaphragm tube rigidly together, making them in effect a single unit. The needle tip ring 30, which is secured to the needle tip by the round head screws 31, fills out the contour of the needle tip, and prevents cavitation of the needle tip by providing a smooth surface over which the discharging fluid passes.

Figures 1, 2, 3:
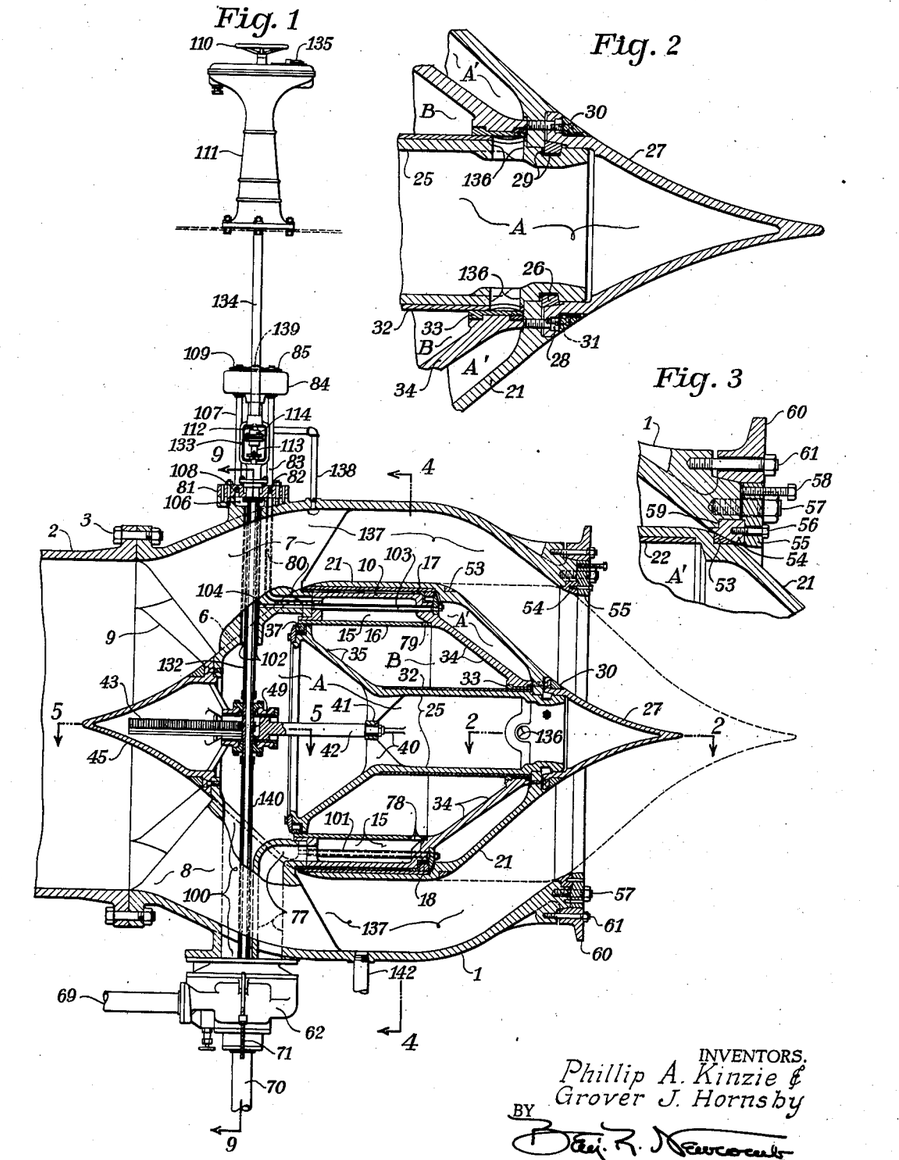
Fig. 1 is a longitudinal sectional elevation showing the valve and associated units.
Fig. 2 is a section taken on the plane 2—2 of Fig. 1.
Fig. 3 is an enlarged view of the seating elements (with needle shown in closed position)
Figure 7:
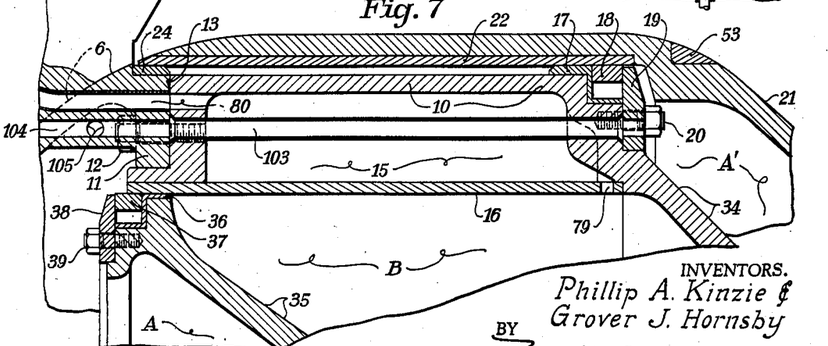
Fig. 7 is a section taken on the plane 7—7 of Fig. 4.

The inwardly extending portion of the diaphragm tube 25 is covered with the non-corrodible sleeve 32, and is supported on the non-corrodible bushing 33 which is retained in the hub element on the conical portion 34 of the body extension 10. The inwardly extending end of the diaphragm tube flares outward into the conical diaphragm 35 which is fitted with the non-corrodible liner 36 in which the piston ring 37 is retained by the ring 38 and studs 39 (Figs. 1 and 7). The liner 36, which slides along the interior of the cylindrical liner 16, also supports and guides the inwardly extending portion of the diaphragm tube.

The four ribs 40 (Figs. 1, 4 and 8) support the hub 41 which is bushed and bored to receive the rack extension stem 42. Through the stem, motion of the diaphragm tube is transmitted to the control rack 43 (Figs. 5 and 6) which is supported by the hub element 44 on the body tip 45. This hub is lined with the non-corrodible bushing 46 and is bored on the vertical center line to receive the flanged bearings 47, which are secured to the hub element 44 by the capscrews 48 and in which the control pinion 49 is journaled. The body tip 45 is secured to the conical body element 6 by the round head screws 50 and has the body tip ring 51 fastened thereon by the round head screws 52 in order that a smooth contour for fluid flow may be attained.

When the needle body 21 has moved to the closed position (Figs. 3 and 8) the seat ring 53 thereon will contact the body seat 54 which is secured to the seat retainer 55 by the capscrews 56. The seat retainer 55 is secured to the body 1 by the studs 57, and a means for removing the seat and retainer ring is provided by the push-off bolts 58. It will be noticed that there is a clearance between the seat retainer 55 and the flange of the body 1, a condition which causes the shoulder 59 on the body seat 54 to bear tightly against the mating shoulder on the body 1 when the studs 57 are drawn up tight. This feature provides a gasketless fluid-tight joint.

The flange clamp ring 60 (Figs. 1 and 3), which is drawn on the body flange by the studs 61 and which produces a compressional stress in the body flange, is made of steel and is employed to reinforce the body in cases where metals such as cast iron or semisteel which have a low tensile strength, are used; however, in cases where the body is made of steel or some metal which has a good tensile strength, the reinforcement can be cast integral with the body. The reason that reinforcing the flange is necessary is that when the needle seat ring 53 contacts the body seat ring 54, there will be a tendency to split the body open because the slope at which the seats contact makes the needle, in effect, a wedge; therefore, it is necessary to employ a reinforcing ring on the body in cases where the metal employed therein would be overstressed or would require large, clumsy flanges to safely resist the forces induced by this condition.

The control valve 62 (Figs. 1, 4, 9, 11 and 12) is secured to the body 1 by the studs 63 which pass through the upper flange of the distance piece 64. The control valve body 65 is attached to the lower flange of the distance piece 64 by the studs 66, and has the cap 67 secured to the underside by the studs 68. The actuating fluid supply enters the control body 65 through the pipe 69; and the pipe 70, which is attached to the cap 67, provides the means for draining fluid from the interior chambers of the valve. The jack bolts 71, which support the control body 65 by lugs thereon, are provided to facilitate assembly of the control valve on the needle valve, and to give additional support for the control valve.

Having disclosed the general construction of the needle valve, there will now be described a full cycle of operation in order that the function of all of the parts and ports of this valve will be fully understood. The description of a full cycle of operation includes first, the filling of the actuating chambers with fluid and the venting of air therefrom; second, the closing of the valve from the fully open position; three, the opening of the valve from the fully closed position; fourth, the holding of the valve in an intermediate position; and fifth, the draining of the valve preparatory to removal from service.

In making the needle valve ready for service, it is essential that the interior chambers A and A' and B be entirely filled with fluid before attempting to operate the valve. In order that these interior chambers A, A', and B will be maintained completely full of fluid, the drain line 70 is connected to a "goose-neck" with an invert above the highest elevation of chamber A'. Assume the needle to be in the position shown on Fig. 1, and the elements of the control valve to be arranged as shown on Figs. 11 and 12.

Pressure fluid is supplied to the chamber 72 (Fig. 11) in the control body 65 by the pipe 69. The fluid entering chamber 72 passes inward through the ports in the non-corrodible liner 73 into the annular space 74 in the control valve 75, whence it passes downward and into the passageway 76 through the ports in the liner 73. Continued flow as described will fill the control valve and the passageway 77 with fluid. The fluid from passageway 77 enters the annular space 15 and will enter chamber B through the port 78. As the fluid rises in chamber B, (Fig. 7) the displaced air will be discharged through the hole 79 in the cylindrical liner 16 into the annular space 15 which is vented through the hole 80 through the body extension 10 and body 1. The body cap 81 has the hole 82 drilled therein which mates with the hole 80 in the body 1, and has attached thereto the vent piping 83 (Figs. 1 and 4) which is connected to the air manifold 84. When chamber B and the annular space 15 have filled with fluid, the water will rise in the air vent piping 83 and the automatic valve 85 on the air vent manifold 84 will rise and give indication that the filling of the interior chamber B and communicating passages is complete. The drain pipe 86 on the air vent manifold is provided to carry away the slight amount of fluid which will pass the automatic valve 85 before it is fully seated.

The design and functioning of the air vent manifold has been fully disclosed in the co-pending patent application, "Valves", filed August 3, 1934, by Phillip A. Kinzie, and, therefore, no further detail thereof will be given in this application.

Figures 4, 5, 6:
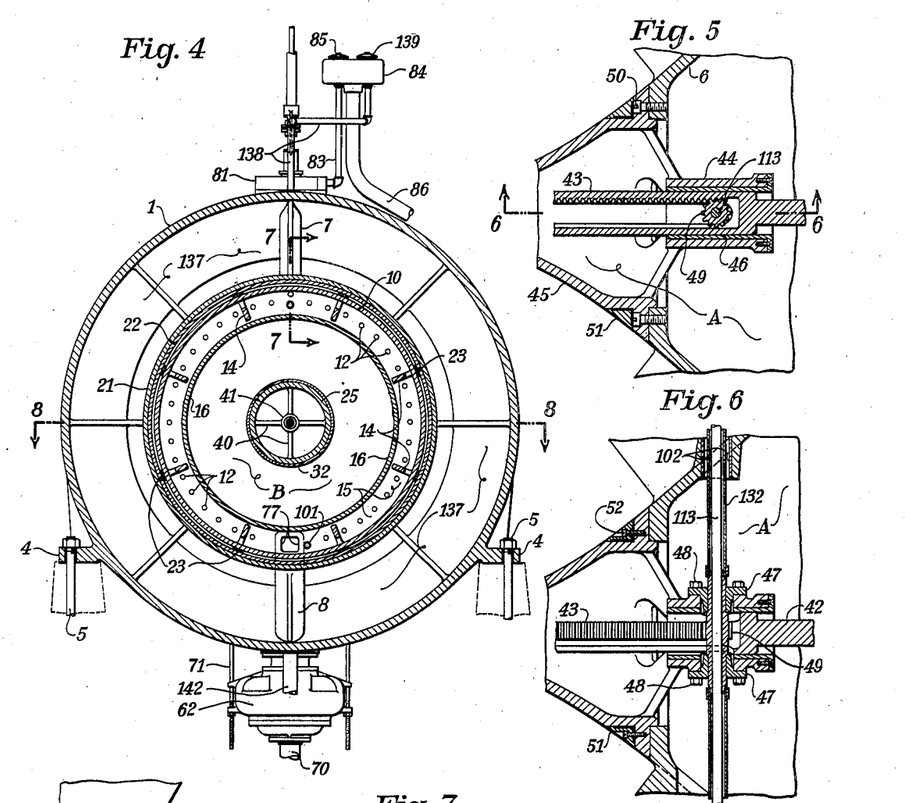
Fig. 4 is a section taken on the plane 4—4 of Fig. 1.
Fig. 5 is a section taken on the plane 5—5 of Fig. 1.
Fig. 6 is a section taken on the plane 6—6 of Fig. 5.

The filling of chambers A and A' proceeds simultaneously with the filling of chamber B. Filling of chambers A and A' as well as the "goose-neck" is accomplished by opening the auxiliary needle valve 87 (Fig. 11), which is built into the control body 65. This valve is provided with the handwheel 88 on the valve stem and is retained in the control body by the nut member 89. The packing 90 together with the gland 91 and the packing nut 92 insure water-tightness of this unit. When the valve 87 is opened, fluid will pass from chamber 72 through the drilled hole 93 into the passageway 94, whence it will flow outward into the passageways 95 (Fig. 12) and into the drain pipe 70. As the "goose-neck" is filled through the drain line 70, the fluid will rise in the vertical passageways 96 whence it will flow inward through the passageway 97 and into the annular space 98 in the control valve 75. From the annular space 98 the fluid will be delivered to the passageway 99, and, as the fluid level rises, will enter chamber A through the passageway 100 in the body 1. Chamber A' is filled through the pipe 101 in the body extension 10 (Figs. 1 and 4). As the fluid rises in chambers A and A' the displaced air will be forced into the annular space 102, (Figs. 1, 6 and 9) through the pipe 103 and communicating hole 104 (Fig. 7) from chamber A' and from chamber A, both directly into the annular space 102 and indirectly through the hole 105 (Fig. 7) which communicates with the hole 104. The space 106 into which the annular space 102 delivers air from chambers A and A' is in communication with the air piping 107 through the drilled holes 108 in the body cap 81. Inasmuch as fluid pressure cannot be built up in chambers A and A', the automatic valve 109 on the air vent manifold 84 will not raise when chambers A and A' are filled; however, the discharge of water over the "goose-neck" will be an indication that the chambers and passageways are filled. The valve 87 (Fig. 11) must then be closed and the needle valve will be ready for operation.

Figure 8:
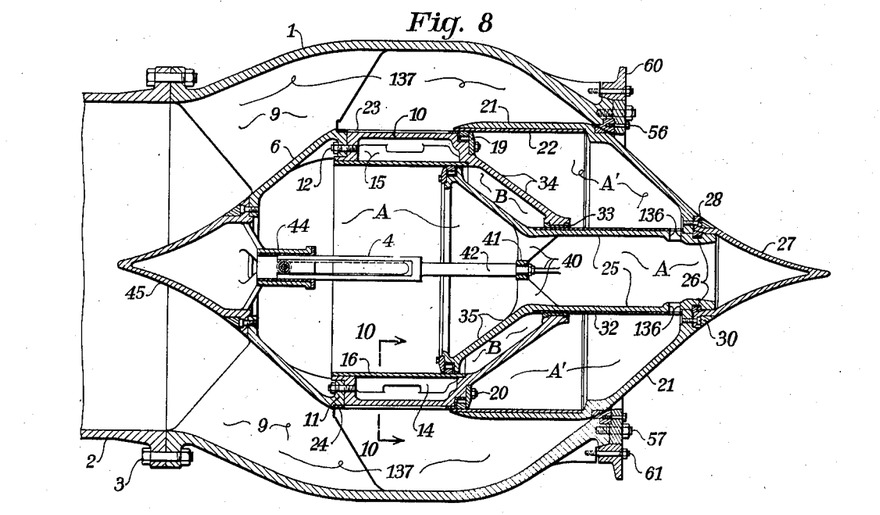
Fig. 8 is a section taken on the plane 8—8 of Fig. 4 (with needle shown in closed position)
Figure 9:
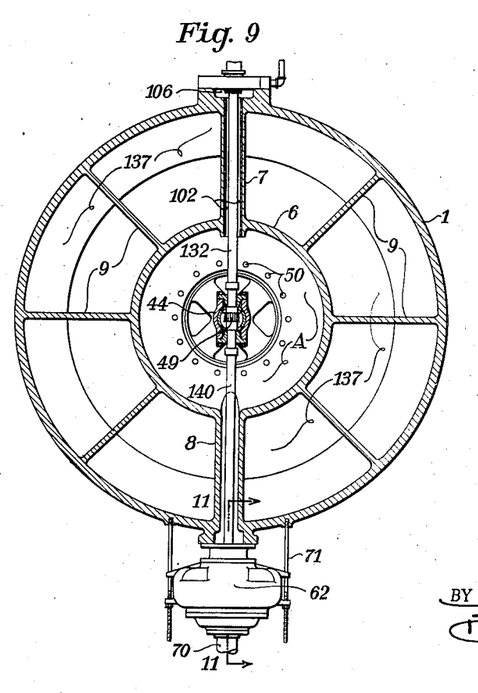
Fig. 9 is a section taken on the plane 9—9 of Fig. 1.
Figure 10:
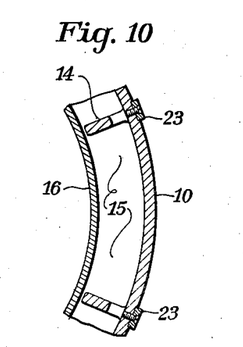
Fig. 10 is a section taken on the plane 10—10 of Fig. 8.

To close the needle valve from the fully open position shown on Fig. 1, i. e., to move the needle unit along the axial center line of the body until it occupies the position shown on Fig. 8 and indicated by the dotted outline on Fig. 1, the hand wheel 110 on the control stand 111 is rotated in a clockwise direction. This rotation is transmitted through a set of reducing gears in the control stand to the shaft 112 which drives the control shaft 113 through the safety shear-pin coupling 114. The shaft passes downward through the needle body into the control valve where the squared end (Fig. 11) is received within a mating squared hole in the control spider 115. The control shaft 113 and spider 115 are supported on the cap 67, and their rotation is made easy by means of the ball bearing 116 which is interposed between the cones in the bushings 117 which are set into the cap 67 and control spider 115.

Rotation of the spider 115 is transmitted to the control nut 118 by the keys 119 which slidingly engage the keyways in the lower skirt thereof. Clockwise rotation of the control nut 118, through the medium of the threads 120, will cause it to travel downward with respect to the control screw 121 which is rotatably retained within a bushed bore in the distance piece by the collar 122 and the nut 123. The collar 122 is locked in place by the setscrew 124 and the wire 125, and the nut 123 is locked by the setscrew 126. Since the control valve 75 is retained with the control nut 118 by the shoulder 127 and the collar 128 which is locked on the control nut by the setscrew 129 and the wire 130, the downward motion of the control nut will carry the control valve with it. When the downward travel of the nut is stopped by the shoulder 131 and the control screw 121, the annular space 98 will direct pressure fluid from chamber 72 into the passageway 99; and the annular space 74 will direct fluid from passageway 76 into passageway 94.

Since fluid pressure from chamber 72 will pass into chamber A through the passageways 99 and 100 whence it will be delivered to chamber A' through the pipes 101 and 103, there will be a hydrostatic force imposed on both the conical diaphragm 35 and upon the conical portion of the needle body 21. This force will cause the needle elements to move toward the body seat 54, and will force the fluid from chamber B through the port 78. This fluid passes into the annular space 15 thence downward through the passageway 77 and into the control valve passageway 76. Since passageway 76 is in communication with passageway 94, the fluid will flow outward into passageway 95 and be discharged over the "goose-neck" through the drain pipe 70.

Since movement of the needle elements is transmitted to the control rack 43 (Figs. 1, 5, and 6), the outward motion of the needle will produce clockwise rotation of the control pinion 49. This rotation will be transmitted upward through the tube 132, coupling 133, and extension tube 134 to the pointer 135 on the upwardly facing portion of the control stand 111, where a graduated dial gives indication of the position of the needle elements. Rotation of the control pinion 49 will also be transmitted downward to the control screw 121 through the tube 140, and will tend to screw the control nut 118 upward; therefore, the speed of rotation for the control nut 118 must be regulated by the handwheel 110 so that it turns fast enough to maintain the control valve 75 in the lower position in order to effect closure of the needle element. The purpose and function of this feature will be fully described later herein.

It is necessary that some means of acceleration and deceleration be applied to the movement of the needle elements. As previously stated, when the needle begins to close from the fully open position, fluid is supplied only through the pipes 101 and 103; however, by examining Figs. 1, 2 and 8, it is evident that as soon as the needle has moved a slight distance toward closure, the circular ports 136 will begin to discharge fluid from chamber A into chamber A' and thereby cause the speed of closure to increase. As the needle nears the closed position, the liner 36 and piston ring 37 will move across the port 78 and decrease the area through which fluid from chamber B is being forced; therefore, the motion of the needle will be slowly decelerated allowing the needle to come to seat with retarded speed. This feature is vital in order that the needle will not slam shut, injuring the seating elements and setting up undesirable water hammer vibrations within the connected hydraulic system. When the needle is being opened, these throttling means will operate in exactly the same manner, only the pressure chambers will be reversed.

With the needle in the closed position, the fluidway 137 in the valve can be filled. The air vent line 138 (Figs. 1 and 4) which is connected to the air manifold 84 and automatic valve 139 allows the air which is displaced by the liquid as it rises in the fluidway and conduit to be released, but prevents escape of liquid therefrom.

To open the valve from the fully closed position, the handwheel 110 on the control stand 111 is rotated in a counter-clockwise direction until the control valve 75 assumes the position shown on Figs. 11 and 12. Fluid pressure will then be supplied to chamber B from chamber 72 through the annular space 74, passageways 76 and 77, annular space 15, and the port 78. Fluid will be forced from chambers A and A' downward through passageways 99 and 100, into the annular port 98 whence it will flow outward into passageways 97, 96, and 95 and be discharged over the "goose-neck" through the drain line 70. As in opening the handwheel must be rotated continuously in order to maintain the control valve 75 in the proper relationship, and effect full opening of the valve.

To set the valve opening for any position between open and closed, the operator needs only to turn the handwheel 110 until the desired opening is registered by the pointer 135 and then stop turning the handwheel; the needle element will automatically remain in the set position.

The manner in which the automatic positioning of the needle elements is accomplished is simple, and is a function of the needle motion with the control rack, pinion, and control valve. As previously described herein, the manual rotation of the control shaft 113 in screwing the control valve 75 downward for closing the needle is opposed by rotation of the control pinion 49 which tends to restore the position of the control valve 75 as the needle moves toward closure. It is this paradoxical condition that permits the needle to be held in an intermediate position. Assume that in closing the needle that rotation of the handwheel 110 is stopped when the valve is only half closed. The needle will move slightly farther toward the closed position, but this motion will be transposed by the control rack 43 and pinion 49 into rotation of the control screw 121. Because multiple pitch threads 120 are employed on the control screw 121, a small degree of rotation of the screw will cause the control nut 118 and the control valve 75 to move upward and stop the flow of pressure fluid into chambers A and A' through the annular port 98 in the control valve 75, by bringing the annular rib 141 on the control valve 75 directly across the ports in the liner 73 from the pressure fluid supply chamber 72. It is apparent now that if the needle moves outward any further that the control valve 75 will be raised still farther and bring the annular port 74 into communication with the fluid pressure chamber 72, a condition which would result in chamber B becoming a pressure chamber and causing the needle to move toward the open position. This condition would, of course, reverse the processes just described and cause the control valve to be screwed downward again.

In actual operation, the annular rib 141 on the control valve 75 will be directly in front of the ports from pressure chamber 72, and any motion of the needle, either toward opening or toward closure, will immediately move the control valve 75 to the position which will counteract the existing movement of the needle. Inasmuch as the pitch of the threads 120 on the control screw 121 is quite steep, a very small amount of rotation is required to move the control nut 75 from the neutral position, i. e., with the annular rib 141 across the pressure ports from chamber 72, and make either chambers A and A' or chamber B a pressure chamber compensating for the incorrect position of the needle. This feature allows the position of the needle to be automatically and accurately maintained within very close limits, for the elements of the control are so constructed that any deviation of the needle element immediately sets up a compensating action. This action does not depend upon whether the needle is being opened or closed; the only requirement for its successful operation being to stop rotation of the handwheel 110 before the needle has reached the fully open or fully closed position.

The action of the control valve as described herein is given only so that its function with relation to the parts of the valve disclosed herein will be understood. The copending application, "Valve control mechanism", filed February 8, 1930 (Serial No. 426,872), by Phillip A. Kinzie, describes fully the functioning of this valve.

To drain the needle valve preparatory to removing it from service, it is necessary to shut off pressure supply to the line 69 and open the auxiliary needle valve 87 (Fig. 11) and a drain valve at the bottom of the "goose-neck". The fluid from the interior of the valve will then drain out through the line 70 and air will be admitted to the interior chambers through the air vent manifold 84. The process of draining the interior is exactly the reverse of filling the interior chambers; therefore, a detailed description will not be given. The pipe 142 is provided to drain the fluid from the water passage 137, and of course during operation of the valve is shut off.

From the foregoing description of the construction and operation of this needle valve, it is apparent that we have achieved the objects of our invention. We have succeeded in adequately supporting and guiding the needle element by a cylindrical element which forms an integral part of the interior operating means. We have provided a valve that, because of the dual closing chambers A and A', is powerful enough to effect closure regardless of the direction of fluid flow. We have provided a valve which by the construction of the needle element and by the absence of longitudinal needle guiding ribs is more efficient hydraulically than any of its prototypes. We have provided a valve which is more economical to build; for example, a valve of the type disclosed herein weighs approximately 25% less than its prototype, and requires 40% less of the expensive, non-corrodible metals for its manufacture. These savings have been made possible by putting practically all of the metal in the valve to effective use. In addition, we have provided a valve that is easy to manufacture, simple and positive in its operation, compact in design, and neat in appearance.

The 60" valve which is illustrated herein, has an overall length of 100", a needle diameter of 64", and a water passage whose maximum interior diameter is 96". The actual weight of a valve of this size and type is 39,300 lbs. of which 3,400 lbs. is bronze or some other non-corrodible metal. These data are given in order to afford a better conception of this valve.

While in the foregoing we have described specific embodiments of the invention, it is, nevertheless, to be understood that in practicing the same we may resort to any and all modifications falling within the scope of the appended claims defining the invention.

We claim—

1. In a needle valve, a casing having a throughway for fluid, telescoping parts, one fixed to the casing and another movable therealong, said movable part being a flow control element for the throughway and having one end closed and means including hollow annular spaced walls defining an annular compartment within said closed end, and means for selectively energizing and relieving said chambers including means forming a fluid flow connection from the interior of the inner annular wall to one of said chambers controllable by movement of said movable part.

2. In a needle valve, a casing having a throughway for fluid, telescoping parts, one fixed to the casing and another movable therealong, both parts having hollow annular spaced walls, said movable part being a flow control element for the throughway and having means including its spaced walls forming an annular compartment at one end thereof, said fixed part telescoping interiorly of said movable part and having means for supporting and guiding said movable part and providing with the movable part means forming a plurality of pressure chambers within said compartment, and means including passageways formed in the fixed and movable parts for selectively energizing and relieving said plurality of chambers.

3. In a needle valve, a casing having a throughway for fluid, telescoping parts, one fixed to the casing and another movable therealong, both parts having spaced annular walls, said movable part being a flow control element for the throughway and having means including its spaced walls forming an annular compartment at one end thereof, said fixed part telescoping interiorly of said movable part and having means for supporting and guiding said movable part and providing with the movable part means forming a plurality of pressure chambers within said compartment, means including passages in the interwall space of the fixed part for selectively energizing and relieving said plurality of chambers, and a passage in the movable part having cooperative relation with the fixed part whereby said passage is covered and uncovered by travel of the movable part along the fixed part.

4. In a needle valve, a casing having a throughway for fluid, telescoping parts, one fixed to the casing and another movable therealong, both parts having spaced annular walls, said movable part being a flow control element for the throughway and having means including its spaced walls forming an annular compartment at one end thereof, said fixed part telescoping interiorly of said movable part and having means for supporting and guiding said movable part and providing with the movable part means forming a plurality of pressure chambers within said compartment, means including passages in the interwall space of the fixed part for selectively energizing and relieving said plurality of chambers, and a passage in the inner wall of the movable part having cooperative relation with the fixed part whereby said passage is covered and uncovered by travel of the movable part along the fixed part.

5. In a needle valve, a casing having a throughway for fluid, telescoping parts, one fixed to the casing and another movable therealong, both parts having spaced annular walls, said movable part being a flow control element for the throughway and having means including its spaced walls forming an annular compartment at one end thereof, said fixed part telescoping interiorly of said movable part and having means for supporting and guiding said movable part and providing with the movable part means forming a plurality of pressure chambers within said compartment, means including passages in the interwall space of the fixed part for selectively energizing and relieving said plurality of chambers, and a passage in the inner wall of the movable part having cooperative relation with the supporting means of said fixed part whereby said passage is closed at one extreme of travel of the movable part.

6. In a needle valve, a casing having a throughway for fluid, an inner shell fixed to the casing and a movable flow control element telescoping therewith, said shell and element cooperatively defining a plurality of pressure chambers, one within said shell and others of annular formation within said movable element, means including a fluid flow connection between said first named chamber and one of said other chambers for initiating relative movement between said parts, and separate means for increasing the speed of said movement.

7. In a needle valve, a casing having a throughway for fluid, an inner shell fixed to the casing and a movable flow control element telescoping therewith, said shell and element cooperatively defining a plurality of pressure chambers, one within said shell and others of annular formation within said movable element, means including separate fluid flow connections between said first named chamber and one of said other chambers for initiating relative movement between said parts and for increasing the speed of said movement, and separate means for retarding said speed.

8. In a valve of the type described, a housing having a throughway for fluid, hollow telescoping parts within said housing, one fixed and one movable relative thereto, said movable part having spaced cylindrical walls and means including said walls forming an annular compartment, said fixed part having a body section closed at one end and an extension section constituting means for supporting said movable part and for dividing said compartment into a plurality of pressure chambers, said extension section terminating within said compartment adjacent the inner cylindrical wall of said movable part and having a cylindrical portion bearing against the outer cylindrical wall of said annular compartment, a sealing ring carried by each part and engaging an adjacent cylindrically formed portion of the other part, means forming an additional pressure chamber within the closed end of said body section adjacent an end wall of one of said other chambers, and means for energizing and relieving said chambers.

9. In a valve of the type described, a housing having a throughway for fluid, hollow telescoping parts within said housing, one fixed and one movable relative thereto, said movable part having spaced cylindrical walls and means including said walls forming an annular compartment, said fixed part having a body section closed at one end and an extension section separably connected thereto, said extension section constituting the sole means for supporting said movable part and providing means for dividing said annular compartment into a plurality of pressure chambers, and means forming passages within said extension section for energizing and relieving said chambers.

10. In combination with a valve body having an opening in a wall thereof, a closure member supported within said body for axial movement relative to said opening, means providing companionate inclined seating surfaces on said member and body, a reinforcing flange surrounding said body at said opening, and means forcing said flange and body into contact along companionate surfaces inclined in the same direction as said inclined seating surfaces.

11. In a needle valve, a casing having a throughway for fluid, telescoping parts, one fixed to the casing and another movable therealong, said movable part being hollow and constituting a flow control element for the fluidway, said fixed part telescoping interiorly of said movable part and having means for supporting and guiding said movable part and providing with the movable part means forming a plurality of pressure chambers within the movable part, and means for selectively energizing and relieving said chambers including means forming a plurality of separate fluid flow connections to one of said chambers, one of which connections is a passageway formed in said fixed part and continuously open to said one chamber and another is a passageway formed in said movable part and controllable by movement of said movable part.

PHILLIP A. KINZIE.
GROVER J. HORNSBY.

CERTIFICATE OF CORRECTION.

Patent No. 2,191,532. February 27, 1940.

PHILLIP A. KINZIE, ET AL.

It is hereby certified that error appears in the printed specification of the above numbered patent requiring correction as follows: Page 5, second column, line 13, claim 1, after the comma and before "and" insert --said fixed part telescoping interiorly of said movable part and having means for supporting and guiding said movable part and providing with the movable part means forming a plurality of pressure chambers within said compartment,--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.